March 15, 1955 G. MANG 2,704,312

THERMOSTATIC SWITCHES

Filed Dec. 19, 1951 2 Sheets-Sheet 1

INVENTOR:
GÉRARD MANG
BY Leon M. Strauss
AGT.

March 15, 1955 G. MANG 2,704,312

THERMOSTATIC SWITCHES

Filed Dec. 19, 1951 2 Sheets-Sheet 2

INVENTOR:
GÉRARD MANG
BY Leon M. Straus
AGT.

2,704,312
Patented Mar. 15, 1955

2,704,312

THERMOSTATIC SWITCHES

Gérard Mang, Paris, France

Application December 19, 1951, Serial No. 262,451
Claims priority, application France December 22, 1950
3 Claims. (Cl. 200—113)

This invention relates to an electric switch wherein the contact making and breaking movements are obtained by reversing the curvature of a resilient "snap" disk to which a concavo-convex shape is given beforehand. This resilient snap disk, the principle of which is already known per se, may be made of various materials and in various shapes; it may be either solid with a central hole, or comprise arms and a peripheral outer edge; it may consist either of a single integral part or of an assembly of parts, for example with an added outer rim; the outer shape of the snap disk may be circular or not.

In most of the known applications the snap disk has two generally symmetrical positions of balance. The snap reversal or deflection of the curvature of this disk may be obtained either by pressing with a sufficient force on its peripheral edge if the center of the disk is fixed, or by acting upon its central portion if the disk is held by its edges.

Also in known applications the perforated center of the disk is fixed and the peripheral edge of the disk is acted upon at two generally diametrally opposite points so as to cause the entire peripheral edge to be reversed if the shape of the disk, that is, its convexity, is preset. In the same case where the central portion of the disk is fixed and its outer edge movable, if the latter carries contact means it is possible to obtain the abrupt opening or closing of an electrical circuit through the mere reversal of the disk.

By modifying the curvature of the disk, that is the degree of the initial deformation of the cup formed thereby, which is obtained as a rule by stamping, punching or any other process, and by varying the diameter of the disk if it is circular, it is possible to increase or reduce the stroke of the movable portion of the disk during the reversal and, therefore, of the contacts. The same applies when the central portion of the disk is movable and the periphery held against movement.

It is the object of this invention to provide an electric switch of this type which is provided with an improved mechanism for controlling the snap reversal of the resilient disk. This mechanism is characterized in that it comprises a rocker actuated by a push-button and adapted when rocked to actuate a strap member acting in turn upon two diametrally opposite points of the peripheral edge of the resilient disk, these points lying on a line at right angles to the line connecting the contacts carried by this disk. As a result, since the disk reversing movement is controlled by acting upon its peripheral edge at two diametrally opposite points on a line at right angles to the contact line, an abrupt upward or downward movement of the contacts is obtained, the center of the disk remaining fixed. On the other hand, the contact pressure is maintained until the disk is snapped to its opposite position. The position of the disk central portion may be modified by means of an adjusting screw in view of bringing about the snap reversal through a shorter or longer stroke of the outer peripheral edge of the disk. The latter may be either of the mono- or bimetallic type; in the latter case with the device of the invention and by acting upon the adjusting screw it is possible to reverse the disk at various temperatures attained on account of the current flowing through this disk.

The attached drawings forming part of this specification illustrate diagrammatically by way of example a practical embodiment of a snap disk switch comprising the improved control mechanism according to this invention. In the drawings.

Figure 1:
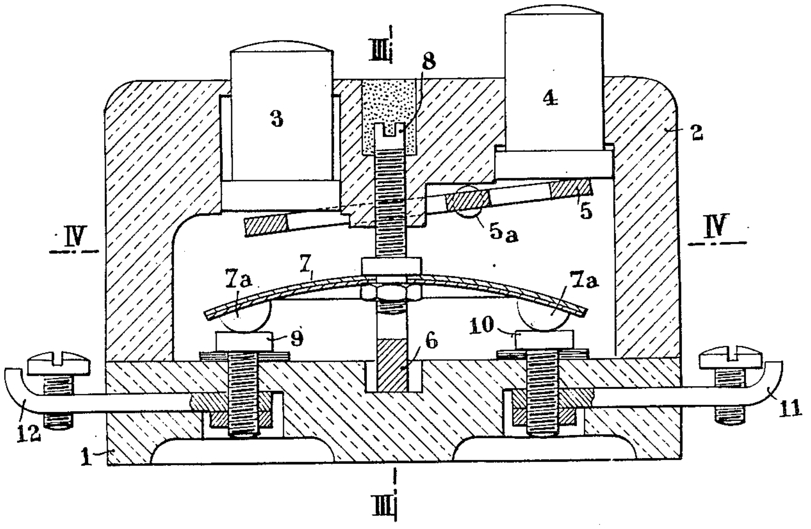
Fig. 1 is a longitudinal section along the line I—I of Fig. 3 showing the switch in its circuit-closing position.
Figure 2:
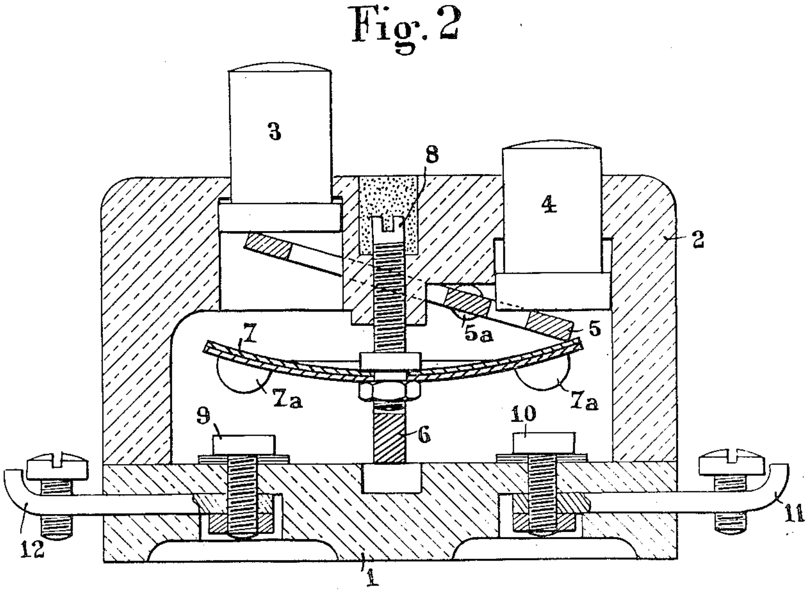
Fig. 2 is a view similar to Fig. 1 illustrating the switch in its circuit-opening position.

Referring now to the drawings, the device comprises a base 1 of insulating material, a cover 2 also of insulating material having mounted the control mechanism thereon, and a pair of insulating push-buttons 3, 4 the inner ends of which engage the end portions of a metallic rocker 5 respectively. This rocker 5 is formed with a pair of pivot pins 5a so engaged in cavities formed in the inner wall of the cover 2 that the rocker may oscillate about the common axis of the pivot pins. The side edges 5b of the rocker 5 engage corresponding grooves 6b formed in a metallic strap member 6 slidably engaged in turn in a pair of vertical guide grooves 2a formed in the cover 2. These guide grooves keep the strap member 6 in a vertical plane at right angles to the common line of silver contacts 7a carried by the bimetallic disk 7. The outer peripheral edge of the disk engages cavities 6a formed in the strap member 6 at two locations lying in a vertical plane at right angles to the aforesaid common line of contacts 7a. A screw 8 engaged in a screw-threaded hole formed in the cover 2 has a head projecting inwards from the inner face of the cover and bearing on the disk 7, thereby permitting variation of the curvature of the disk and therefore the stroke both of its peripheral outer edges and of the contacts during the reversing movement.

The fixed contacts 9 and 10 are electrically connected with brass terminals 11, 12 for permitting the connection with circuit conductors and the passage of current through the bimetallic disk across the movable silver contacts.

Figure 3:
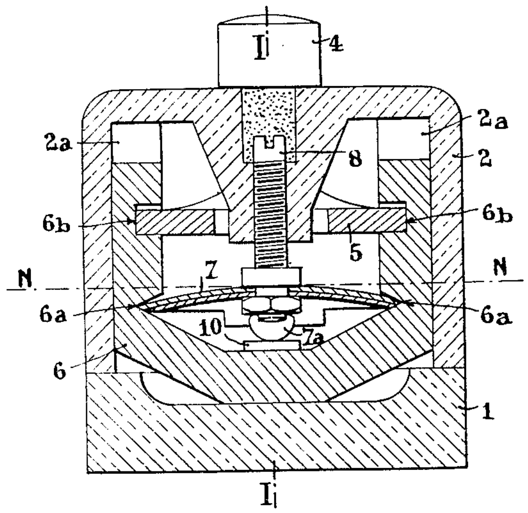
Fig. 3 is a cross-section of the switch according to the line III—III of Fig. 1.
Figure 4:
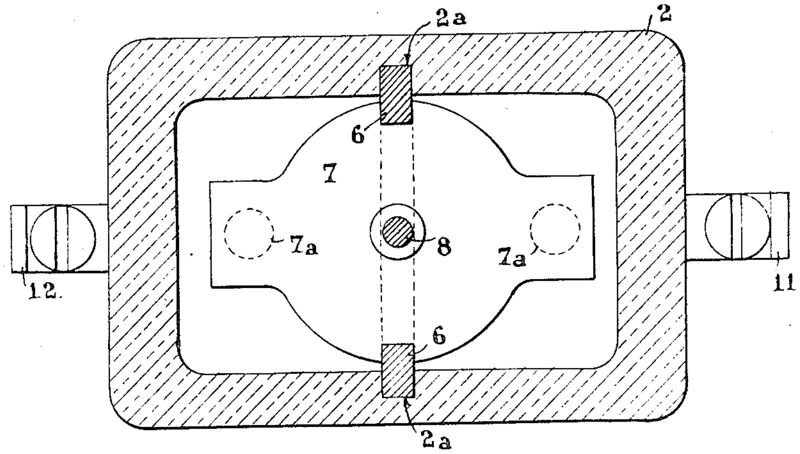
Fig. 4 is a longitudinal section of the switch along the line IV—IV of Fig. 1.
Figure 5:
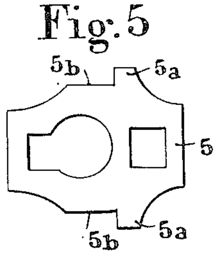
Fig. 5 is a plan view of the rocker.

The switch described hereinabove operates as follows:

With the device in the "on" position (Figs. 1, 3 and 4) the circuit connected to the terminals 11, 12 may be opened by merely depressing the "off" push-button 4. The latter causes the corresponding end of the rocker 5 to move downwards about the pivot pins 5a and the rocker 5 will thus lift the sliding strap member 6. During its upward movement the strap member 6 carries along the diametrally opposite points 6b of the peripheral edge of the disk 7. When these points overstep the plane of the fixed central portion of the disk as illustrated by the line N—N, Fig. 3, the disk is abruptly reversed and snapped to a position such that its convex side becomes concave and vice-versa. Thus, the movable contacts 7a are rapidly separated from the fixed contacts 9 and 10 at the time of the reversal and the circuit is opened.

For closing the circuit when the latter is open the "on" push-button 3 is depressed. The corresponding end of the rocker 5 carries along during its downward movement the strap member 6 and the snap reversal of the disk is obtained in the same manner as in the circuit-opening operation described in the preceding paragraph when the two points of the outer peripheral edge of the disk which are engaged in the cavities 6a overstep the plane N—N in the downward direction. The movable contacts 7a will thus abruptly engage the fixed contacts 9 and 10.

One characteristic feature of the device according to this invention consists in acting upon two diametrally opposite points of the disk, which are positioned on a line at right angles with the line of contacts 7a. With this arrangement it is possible, during all the time in which a contact breaking movement is prepared, that is until the outer edges of the disk overstep the central plane N—N in the upward direction, to cause the movable contacts 7a to bear with a considerable pressure against the fixed contacts 9 and 10, irrespective of the speed at which the push-button is depressed. With this arrangement it also is possible to obtain a maximum spacing of the contacts consistent with the dimensions of the disk and the initial deformation to which it has been subjected.

The switch shown in the drawings can be actuated either manually or thermally. The bimetallic disk 7 is made of two metals having different temperature coefficients, so that the snap reversal of the disk from the "on" position may be obtained either by depressing the push-button 3, or by a change in temperature of the disk 7 which, on account of the bimetal properties, will suddenly be deflected by itself when its temperature rises to a certain value, thereby opening the circuit. Thus, the device, if provided with a suitably shaped and dimensioned bimetallic disk, automatically cuts the current flow therethrough when the disk is heated to a given temperature value.

The temperature at which the snap reversal occurs may be caused: by the room atmosphere, the device acting as a high-accuracy thermostat; by the heating resulting from the passage of current through the disk and from the resistance thereof, so that the apparatus operates as a high-accuracy cut-out adapted to protect a circuit or any electrical apparatus against overloads.

The combination with the device manually controlled through the pair of "on" and "off" push-buttons of a bimetallic disk makes it possible to construct either a thermostat switch or a cut-out switch, adapted to effect three different operations, namely:

Closing a circuit by depressing the push-button 3;

Opening a circuit by depressing the push-button 4;

Opening a circuit in case an overload occurs in the circuit if the apparatus operates as a cut-out or circuit-breaker, or, in case the room temperature rises, if the apparatus operates as a thermostat.

The conditions in which the manual control of the disk is obtained, that is, the up or downward displacement of the strap member 6 acting on the outer peripheral edge of the disk at two diametrally opposite locations positioned on a line at right angles to the common contacts line, are such that, considering the possibility of adjusting by means of the screw 8 the convexity of the disk and therefore its stroke as well as the position of the plane N—N corresponding to the disk snap reversal, the cut-out or thermostat is of the free-release type. This means that, as long as the disk has not cooled to a temperature corresponding to normal room temperature, it is not possible to cause the movable contacts 7a to engage the fixed contacts 9 and 10 by depressing the "on" push-button. Similarly it is not possible voluntarily to keep the circuit closed by maintaining the "on" push-button depressed if the disk is brought to the temperature corresponding to its snap reversal on account either of the room atmosphere if the device operates as a thermostat or of a heating resulting from the current passing therethrough if the apparatus operates as a cut-out.

Of course, the constructional details of the disk reversal control mechanism according to this invention described hereinabove and illustrated in the accompanying drawings are given solely by way of example and do not limit the invention as many modifications may be brought to the embodiment shown and described without departing from the spirit and scope of the invention.

What I claim as new is:

1. A both thermically and manually operable switch, adapted to automatically open a circuit upon occurrence of predetermined thermal conditions, said switch comprising a casing, a pair of fixed contacts secured to said casing, a pair of terminal members connected to said fixed contacts, a concavo-convex bimetallic snap-acting disk having its center fixed to said casing, a pair of contacts on said disk in register with said fixed contacts for engagement therewith in the cold position of said snap-acting disk, this latter disengaging thus automatically its contacts from the fixed contacts whenever its temperature is raised to a predetermined value, guides in said casing substantially perpendicular to said disk, a slide-member on said guides having an operative connection with said disk at two substantially diametrally opposite points thereof located on a line transverse to the line of the contacts carried by said disk, a rocker in said casing having an operative connection with said slidable member, and hand-operated control means on said casing for pivoting said rocker and thereby sliding said slide member on the guides, operating thus the contacts of the snap-acting disk in relation to the fixed contacts.

2. A both thermically and manually operable switch adapted to automatically open a circuit upon occurrence of predetermined thermal conditions, said switch comprising a casing, a pair of fixed contacts secured to said casing, a pair of terminal members connected to said fixed contacts, a concavo-convex bimetallic snap-acting disk having its center fixed to said casing, a pair of contacts on said disk in register with said fixed contacts for engagement therewith in the cold position of said snap-acting disk, this latter disengaging thus automatically its contacts from the fixed contacts whenever its temperature is raised to a predetermined value, guides in said casing substantially perpendicular to said disk, a strap member guided in said guides and connected to a pair of diametrally opposite points of the disk located on a line transverse to the line of the contacts carried by said disk, a rocker in said casing having an operative connection with said strap-member, and hand-operated control means on said casing for pivoting said rocker, thereby displacing said strap member on the guides and operating the contacts of the snap-acting disk in relation to the fixed contacts.

3. A both thermically and manually operable switch, adapted to automatically open a circuit upon occurrence of predetermined thermal conditions, said switch comprising a casing, a pair of fixed contacts secured to said casing, a pair of terminal members connected to said fixed contacts, a concavo-convex bimetallic snap-acting disk having its center fixed to said casing, a pair of contacts on said disk in register with said fixed contacts for engagement therewith in the cold position of said snap-acting disk, this latter disengaging thus automatically its contacts from the fixed contacts whenever its temperature is raised to a predetermined value, guides in said casing substantially perpendicular to said disk, a slide-member on said guides having an operative connection with said disk at two substantially diametrally opposite points thereof located on a line transverse to the line of the contacts carried by said disk, a two armed rocker in said casing having an operative connection with said slidable member, and a pair of push-buttons on said casing adapted for respective engagement with the respective arms of said rocker, thereby for pivoting the rocker respectively in each direction and for operating the contacts of the snap-acting disk in relation to the fixed contacts secured to the casing.

References Cited in the file of this patent

UNITED STATES PATENTS

| | | |
|---|---|---|
| 1,918,491 | Ross | July 18, 1933 |
| 2,205,240 | Clark | June 18, 1940 |
| 2,434,984 | Bolesky et al. | Jan. 27, 1948 |
| 2,439,338 | Fuge et al. | Apr. 6, 1948 |
| 2,488,049 | Bolesky | Nov. 15, 1949 |